(No Model.)
W. J. LORING.
BELT FOR ORE CONCENTRATORS.
No. 550,517. Patented Nov. 26, 1895.
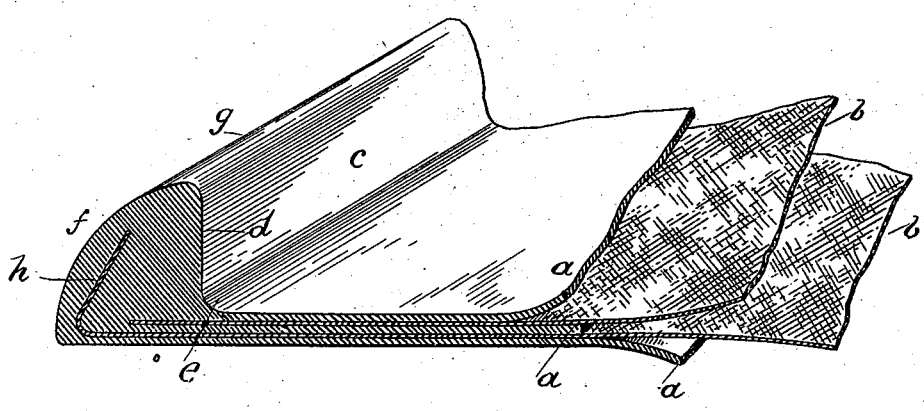
Witnesses.
Inventor.
William J. Loring
by Spear & Seely.
Attorneys

UNITED STATES PATENT OFFICE.

WILLIAM JOSEPH LORING, OF ANGEL'S CAMP, CALIFORNIA.

BELT FOR ORE-CONCENTRATORS.

SPECIFICATION forming part of Letters Patent No. 550,517, dated November 26, 1895.

Application filed June 5, 1895. Serial No. 551,713. (No model.)

*To all whom it may concern:*

Be it known that I, WILLIAM JOSEPH LORING, a citizen of the United States of America, residing at Angel's Camp, in the county of Calaveras and State of California, have invented certain new and useful Improvements in Belts for Ore-Concentrators; and I do hereby declare that the following is a full, clear, and exact description thereof.

My invention relates to the flexible belts used in machines for the wet concentration of precious ores.

My invention is an improvement in a particular class or kind of such belts—viz., belts composed of layers of rubber and textile material and provided with a rubber flange extending continuously along each edge for retaining the contents and preventing them from being washed off and over the side or edge by the motion of the machine. The rubber flanges are exposed to greater strain than the remainder or working part of the belt when passing over the end rollers of the frame on which it is mounted, and as they are comparatively thin they are liable to tear from their edges toward their bases, and thus their continuity is destroyed. My invention is designed to obviate this difficulty and to increase the life of the belt-flange, and I accomplish my object by an improved shape of flange, bringing the strain on the broad base of a well-supported flange, reinforced with one or more pieces or layers of the textile material, cut on the bias, forming part of the compound body of the belt and retaining its regular upright position in passing the end rollers without tearing or cracking.

The belt is made with alternate layers of rubber $a$, and of canvas, duck, or other textile material $b$, cut on the bias, adding strength with elasticity, united into a homogeneous flexible body by pressure. The flange $c$ is a mass of rubber of purer quality than the main body of the belt. The form of the flange, which is given to it by a mold of proper shape, is clearly shown in the drawing. It has a broad base, a straight vertical inside face $d$, merging with the body of the belt by a curved line $e$, and an inclined tapering outer face $f$, which I prefer to make in a convex curve from the base toward the edge $g$. The curved configuration at the junction of the flange and the belt-surface takes away the right angle or acute angle generally found there and destroys the corner which ordinarily serves as a lodging-place for more or less of the pulp. A layer or ply of the canvas, duck, or other textile cut on the bias is extended beyond the other or others and turned up and embedded in the soft rubber of the flange, as shown at $h$, throughout the whole extent of the latter around the endless belt. This materially strengthens the flange and renders it impossible for such flanges to be torn through from edge to the base, as is ordinarily liable to occur with rubber flanges not reinforced. Ordinarily I have found the flange sufficiently strengthened by using one layer in this way, which, being cut on the bias, allows it to stretch with the rubber, and at the same time the elasticity of the flange is not materially affected.

By constructing the flanges of ore-belts according to my invention the life of the belt is increased. It is obvious that my method of reinforcing with bias-cut canvas can be applied to belt-flanges of other cross-section than that shown and described.

What I claim is—

1. A belt for the purpose described composed of layers of rubber and of textile material cut on the bias, and having a solid rubber edge flange, a part of the textile material being embedded in said flange, substantially as described.

2. A belt for the purpose described composed of alternating layers of rubber and of textile material cut on the bias, and having a solid rubber edge flange, one of said layers of textile material being extended sidewise and embedded in said flange, substantially as described.

In testimony whereof I have affixed my signature, in presence of two witnesses, this 22d day of May, 1895.

WILLIAM JOSEPH LORING.

Witnesses:
 THOS. G. PEACHEY,
 C. H. McCLOY.